United States Patent [19]

Huang

[11] Patent Number: 5,329,393
[45] Date of Patent: Jul. 12, 1994

[54] OPTICAL NYQUIST RATE MULTIPLEXER AND DEMULTIPLEXER

[75] Inventor: Alan Huang, Middletown, N.J.

[73] Assignee: AT&T Bell Laboratories, Murray Hill, N.J.

[21] Appl. No.: 961,599

[22] Filed: Oct. 15, 1992

[51] Int. Cl.$^5$ .............................................. H04J 14/00
[52] U.S. Cl. .................................... 359/135; 359/158
[58] Field of Search ....................... 359/115, 135–140, 359/158

[56] References Cited

U.S. PATENT DOCUMENTS

| | | | |
|---|---|---|---|
| 4,229,830 | 10/1980 | Ryan | 359/133 |
| 4,546,249 | 10/1985 | Whitehouse | 359/135 |
| 4,628,493 | 12/1986 | Nelson | 359/135 |
| 4,718,063 | 6/1985 | Reedy et al. | 370/112 |
| 4,959,828 | 9/1990 | Austin | 359/158 |
| 5,144,375 | 5/1990 | Gabriel et al. | 356/345 |

OTHER PUBLICATIONS

R. S. Tucker et al., "Optical time-division multiplexing for very high bit-rate transmission," Journal of Lightwave Technology, vol. 6, No. 11, Nov. 1988, pp. 1737–1749.

M. Jinno et al., "All-optical regenerator based on nonlinear fiber sagnac interferometer," Electronics Letters, vol. 28, No. 14, Jul. 2, 1992, pp. 1350–1352.

P. R. Prucnal et al., "12.5 Gbit/s fibre-optic network using all-optical processing," Electronics Letters, vol. 23, No. 12, Jun. 4, 1987, pp. 629–630.

K. J. Blow et al., "Demonstration of the nonlinear fibre loop mirror as an ultra fast all-optical demultiplexer," Electronics Letters, vol. 26, No. 14, Jul. 5, 1990, pp. 962–964.

C. A. Brackett et al., "Future trends in lightwave technology," Proceedings of the National Communications Forum, Rosemont, USA, Oct. 7, 1985, pp. 371–376.

Primary Examiner—Leslie Pascal
Attorney, Agent, or Firm—John A. Caccuro

[57] ABSTRACT

An optical multiplexer cyclically samples a plurality (N) of optical input signals, each derived from an electrical input signal, at a frequency rate which equals or exceeds the Nyquist rate of each electrical input signal. A demultiplexer demultiplexes a received multiplexed optical signal into N optical signal sample streams which are then converted into the original N electrical input signals using the low-pass electrical frequency filter characteristics of the optical detectors and electrical circuits which connect to the N demultiplexer outputs.

24 Claims, 3 Drawing Sheets

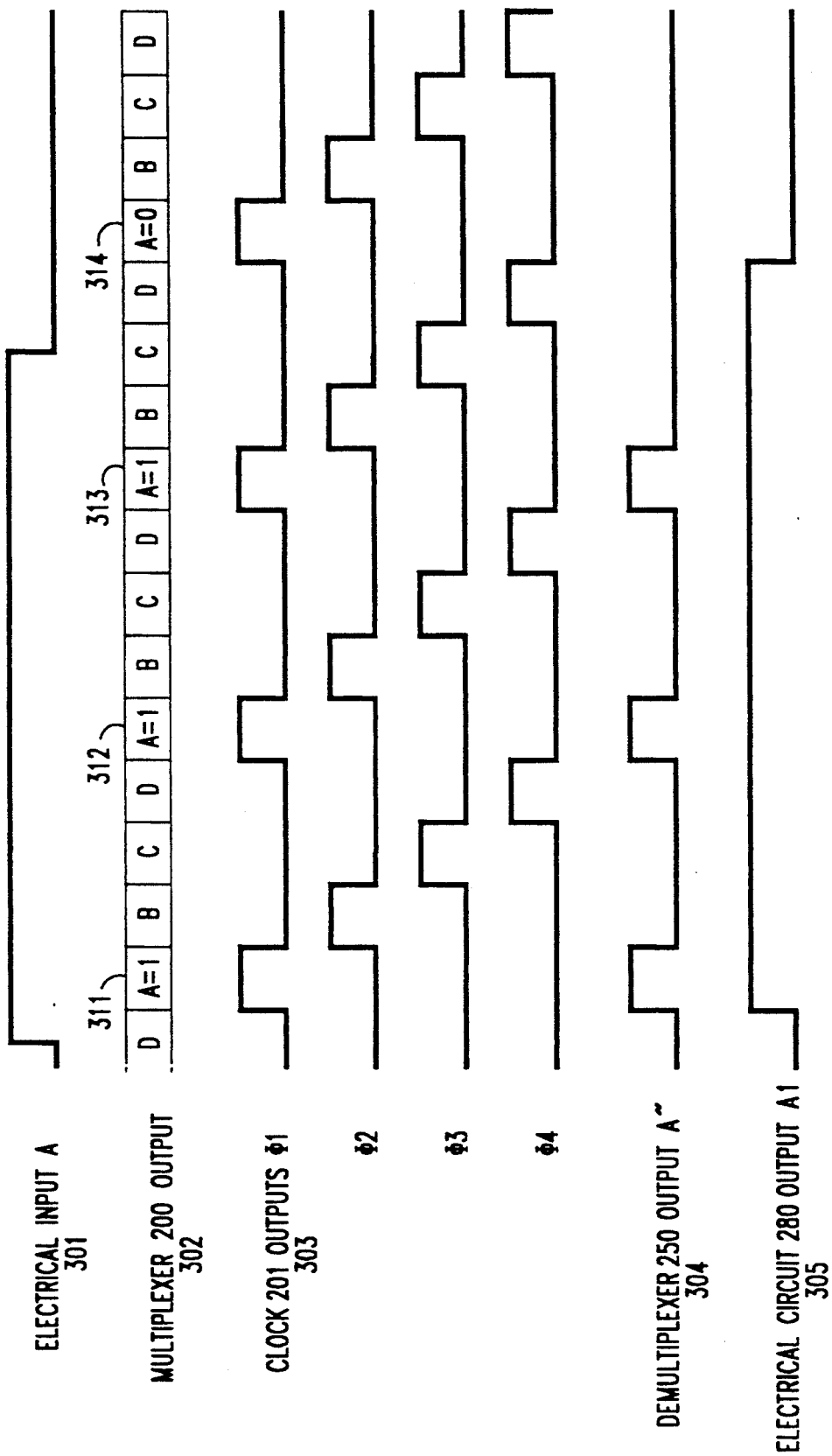

OPTICAL NYQUIST RATE MULTIPLEXER AND DEMULTIPLEXER

TECHNICAL FIELD

This invention relates to optical communication circuits and, more particularly, to an all-optical multiplexer and demultiplexer.

BACKGROUND OF THE INVENTION

With reference to FIG. 1 we briefly describe the operation of a typical prior art electronics-based multiplexer/demultiplexer circuit. Each input (e.g., A) consists of an elastic buffer (e.g., 101) and a clock recovery circuit (e.g., 103). The clock recovery circuit extracts clock C1 from the input data signal and uses it to clock the data into elastic buffer 101. This data is then clocked out of the elastic buffer with a local clock C2, sampled by the multiplexer 105 and transmitted over communication link 107. At demultiplexer 113, the clock C1 is recovered by circuit 109 from the transmitted signal and used to clock the data into elastic buffer 111. A local clock C3 synchronized with demultiplexer 113 is used to clock the data from elastic buffer 111 to demultiplexer 113. Additionally, multiplexers 105 and 113 have to be synchronized.

Such electronic multiplexer/demultiplexer circuits usually have to be adapted to accommodate the data rate of a variety of continuous or packet input data rates by adjusting the size of the elastic buffers, as long as the data clock rate C2 is greater than the long term average data rate of input A. As input data rates increase and/or communication link data rates change, the multiplexer/demultiplexer may have to be adapted or redesigned and clock recovery gets more difficult. Such adaptations and redesigns are expensive.

SUMMARY OF THE INVENTION

In accordance with the present invention, I have recognized that all the elastic buffers and clock recovery circuits can be eliminated if 1) the multiplexer and demultiplexer were implemented using optical circuits which operate fast enough to sample and process each input signal at a data rate which equals or exceeds the Nyquist sample rate of the input signals and 2) the outputs of the demultiplexer are passed through a low-pass filter. In accordance with one feature of my invention, the electronic circuitry to which the demultiplexer output connects may be utilized as the low-pass filter.

More particularly, my apparatus for optically multiplexing a plurality (N) of electrical input signals includes means for receiving and converting electrical input signals into N corresponding optical input signals and optical circuit means for cyclically sampling the optical input signals at a rate which at least equals the Nyquist rate for each electrical input signal and for generating a multiplexed optical output signal formed from the optical input signal samples.

My demultiplexer apparatus demultiplexes a received multiplexed optical signal into N optical signal sample streams which are then converted into the original N electrical input signals using the low-pass electrical frequency filter characteristics of the optical detectors and electrical circuits which connect to the N demultiplexer outputs.

According to one feature of my invention, optical sampling is accomplished using optical AND gates which have optical data and clock inputs. Well-known Sagnac switches may be used to implement the optical AND gate circuits utilized in the multiplexer and demultiplexer of the present invention.

BRIEF DESCRIPTION OF THE DRAWING

In the drawing,

FIG. 3 shows an illustrative timing diagram for the circuits of FIG. 2; and

DETAILED DESCRIPTION

In the following description, each item or block of each figure has a reference designation associated therewith, the first number of which refers to the figure in which that item is first located (e.g., 105 is located in FIG. 1).

Figure 1:
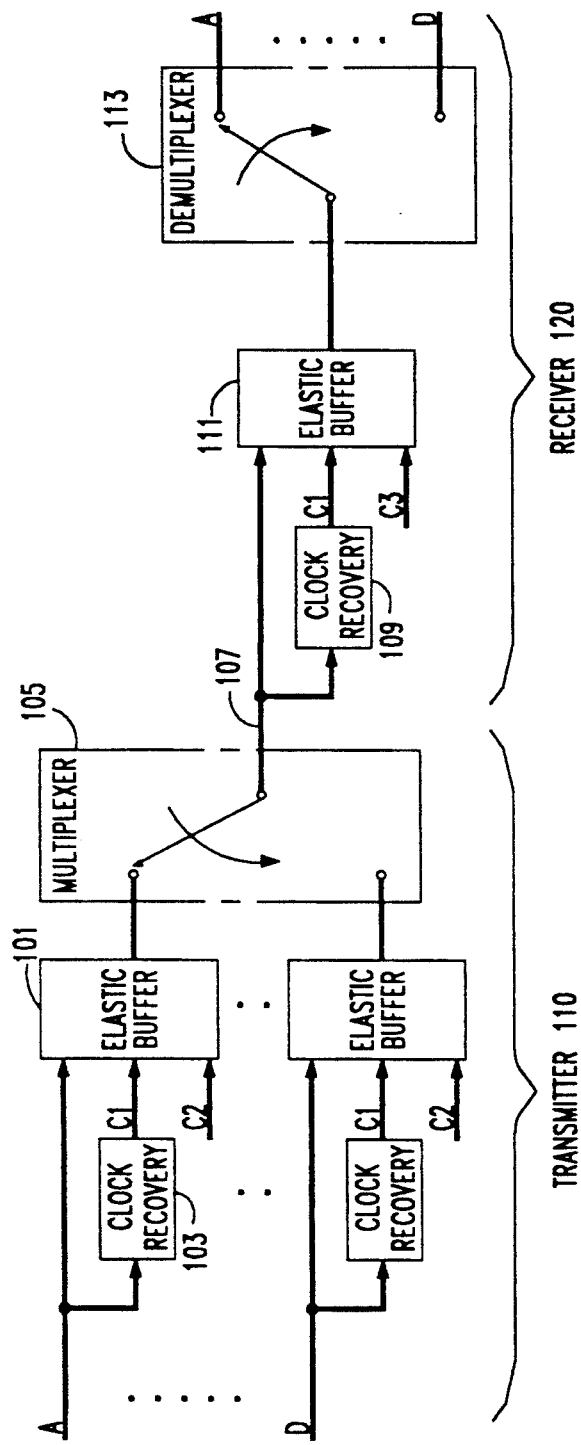
FIG. 1 shows a block diagram of a prior art multiplexer and demultiplexer circuit.

The operation of the prior art electronics-based multiplexer/demultiplexer circuit shown in FIG. 1 has been previously described in the Background of the Invention section.

Figure 2:
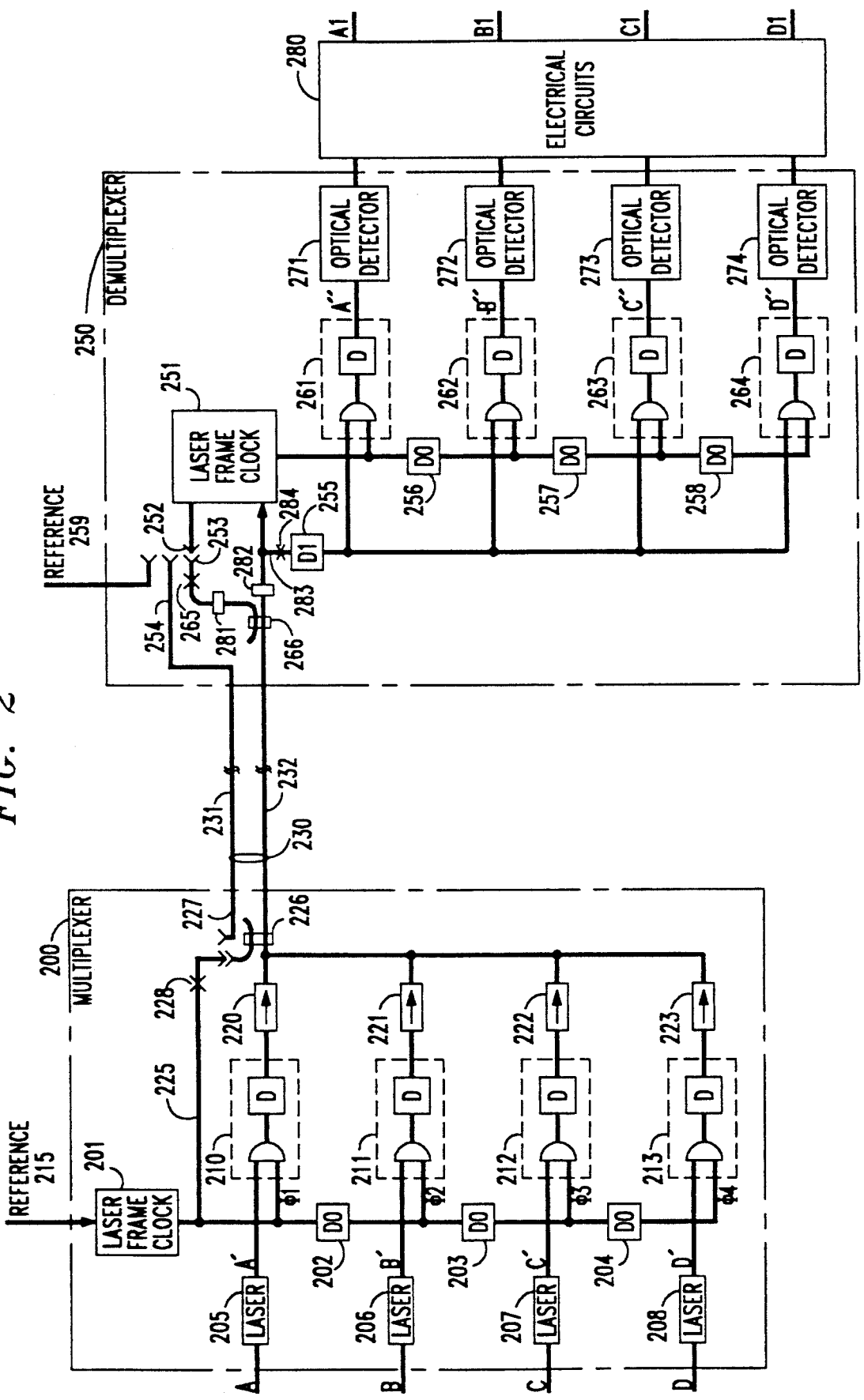
FIG. 2 shows a block diagram of an all-optical multiplexer and demultiplexer circuit in accordance with the present invention.

Shown in FIG. 2 is a block diagram of an illustrative time-division-multiplexed (TDM) system including all-optical multiplexer and demultiplexer circuits implemented in accordance with the present invention. While FIG. 2 illustrates a four-channel multiplexer/demultiplexer, it should be understood that the number (N) may be selected to be any number which ensures that the multiplexer can equal or exceed the Nyquist sample rate of any signal on any of the N channels. For example, even at today's fastest electrical digital data signal rate of several gigahertz, optical based multiplexers can be implemented to sample at above the Nyquist rate.

Figure 4:
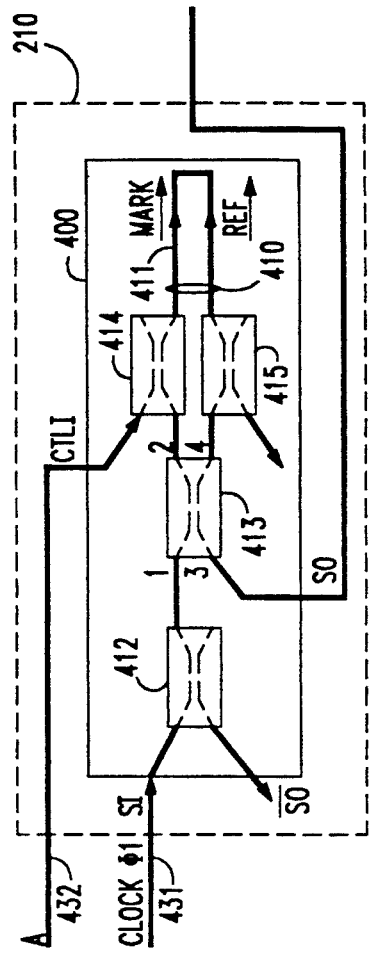
FIG. 4 shows a block diagram of a Sagnac switch used to implement an optical AND circuit used in the block diagram of FIG. 2.

Multiplexer 200 is shown to include four optical AND gates 210, 211, 212 and 213 having, respectively, input optical digital signals A', B', C' and D', connected thereto. (The implementation of the optical AND gates, shown in FIG. 4, is illustratively implemented using Sagnac gates as described in later paragraphs). Optical lasers and polarizers 205-208 are used to convert the electrical digital data signals A–D into horizontally (H) polarized optical digital data signals A'–D'. The other inputs to optical AND gates 210 through 213 connect to various phases of a laser frame clock 201. Note, laser frame clock circuit 201 generates a vertical (V) polarization signal as compared to the H polarization of optical data signals A'–D' to ensure that the Sagnac AND gates 210-213 operate correctly. The output of laser frame clock 201 which is input into optical AND gate 210 is referred to as phase 1 ($\phi1$). Optical delay circuit 202 provides a delay D0 to the phase 1 clock signal to provide a phase 2 clock signal ($\phi2$). Similarly, delay circuit 203 generates a phase 3 clock signal ($\phi3$) from the phase 2 clock signal and delay circuit 204 generates a phase 4 clock signal ($\phi4$) from the phase 3 clock signal. The laser frame clock 201 operates at a rate which equals or exceeds the Nyquist sample rate for each of the electrical digital input signals A–D. The delay D0, which may be implemented using a coil of optical fiber, is equal to one bit time of the frame clock 201. While the same delay D0 is shown for each stage, different delay values may be utilized.

The combination of the four-phase clock signal and AND gates 210-213 form an optical sampling circuit which causes the inputs A-D to be cyclically sampled once each data frame. Since the optical AND circuits 210-213 are implemented using Sagnac gates, their outputs have the same V polarization as the clock signal 201. The outputs connect, respectively, to optical isolators 220-223 forming an optical OR circuit to combine the optical samples to generate the multiplexer output signal which is transmitted over optical fiber 232 of the optical fiber link 230.

The all-optical demultiplexer 250 is shown to include optical AND gates 261-264, laser frame clock 251 and a plurality of delay circuits 256-258 and optical detectors 271-274. Laser frame clock 251 is arranged to output a V polarized clock signal. When the multiplexed data signal is received over optical fiber 232, its polarization is changed from V to H by rotating fiber 283 by 90 degrees (shown by 284) prior to connection to delay circuit 255. The multiplexed data signal is delayed in delay circuit 255 and applied to one input of each of the optical AND gates 261-264. The delay D1 of circuit 255 is adjusted so that the data sample A and clock phase 1 are in sync. The laser frame clock 251 is applied to the second input of optical AND gate 261 as a phase 1 clock signal. Optical delay circuit 256 generates a phase 2 clock signal from the phase 1 signal, which is applied to optical AND gate 262. Optical delay circuit 257 generates a phase 3 clock signal from the phase 2 clock signal, which is then applied to optical AND gate 263. Similarly, optical delay circuit 258 generates a phase 4 clock signal from the phase 3 clock signal, which is then applied to optical AND gate 264. The demultiplexed outputs of optical AND circuits 261-264 are, respectively, the optical signals A"-D" which are samples of the input electrical signals A-D, respectively. The optical detectors 271-274 convert the optical signal samples A"-D" into electrical signal samples A1-D1. Optical detectors 271-274 and/or the connecting electrical circuit 280, by virtue of its inherent electrical signal bandwidth, filters the sample signals A"-D" to produce the electrical output signals A1-D1. Note, electrical circuit 280, illustratively, represents the prior art electrical circuits which connect to the output of demultiplexer 250 to process the signals in accordance with the particular application. In FIG. 2, we assume that the optical detectors 271-274 and/or electrical circuit 280 cannot operate at the high optical digital signal sample rate A"-D". They effectively filter the signal samples into electrical signals A1-D1. In a practical arrangement, the multiplexer 200 and demultiplexer 250 would operate at a data rate which would insure that the detectors 271-274 and/or electrical circuit 280 would act as a low-pass filter. Since optical data transmission rates today exceed electrical data transmission rates by a factor of 100, the need for separate low-pass filters may, if desirable, be obviated in most designs.

Note, however, if the Nyquist sample signals A"-D" are at a rate which can be handled by electrical circuits, then low-pass filters (not shown) must be included to recover the original signals A-D from the electrical Nyquist sample signals outputted from the optical detectors 271-274.

With reference to FIG. 3, we describe the timing diagram for a typical electrical input signal A, shown as 301. The multiplexer 200 output, consisting of cyclic samples of input signals A-D, is shown in 302. Note that the samples of electrical input A are logic 1 during the time slots 311, 312 and 313 and logic 0 during the time slot 314. The multiplexer 200 output for time slot A is obtained by ANDing the clock phase 1 signal with electrical input A in optical AND circuit 210. At the demultiplexer 250 clock phase 1 is ANDed with the received multiplexer output signal 302 in optical AND gate 261 to obtain the demultiplexer output A', shown in 304. Because the demultiplexer 250 output A' has a data rate which equals or exceeds both the Nyquist sample rate of electrical input A and the maximum electrical data rate, the input A signal can be obtained after it is low-pass filtered by optical detector 271 and/or electrical circuits 280. Again, this is because the electrical bandwidth of detector 271 and/or electrical circuits 280 is not sufficiently large enough to pass the bandwidth of the optical signal samples A"-D" outputted from demultiplexer 250. The recovered output A1 of electrical circuits 280, shown in 305, is essentially the same as the electrical input A shown in 301.

Thus, the all-optical multiplexer 200 and demultiplexer 250 of the present invention, operate fast enough to sample each of the electrical signal inputs A-D at a rate above their respective Nyquist rates so that the original electrical signal inputs A-D can be effectively reconstructed by merely detecting the optical signal samples A"-D" (using optical detectors 271-274) and passing them through a low-pass filter (using optical detectors 271-274 and/or electrical circuits 280).

Thus, multiplexer 200 of the present invention eliminates the need for the clock recovery circuit 103 and elastic buffers 101 required by prior art multiplexers 105. Similarly, the demultiplexer 250 of the present invention eliminates the need for clock recovery circuit 109 and elastic buffer 111 required by prior art demultiplexers 113.

With reference again to FIG. 2, the multiplexer 200 and demultiplexer 250 may utilize a clock signal derived from a variety of sources. Optionally, in case 1 the clock signal may be derived from a local clock source. In multiplexer 200 this is shown by laser frame clock 201 which is synchronized using local reference signal 215. Reference signal 215 may be, illustratively, derived from an atomic clock signal and, hence, very precise. Similarly, laser frame clock 251 may also be synchronized to a reference signal 259 which may be the same as reference 215 or synchronized thereto.

Optionally, in case 2, the multiplexer 200 may send a clock signal over optical fiber 232 which is polarized 90 degrees with respect to the data signal outputted by multiplexer 200. In our example, the data signal has V polarization while the clock signal has H polarization. This is accomplished by rotating the optical fiber 228 by 90 degrees prior to its connection to coupler 226. This clock signal is coupled via coupler 226 to optical fiber 232. Polarization ensures that the optical clock signal and data signal (which has the same vertical polarization as the clock signals $\phi 1$-$\phi 4$) on optical fiber 232 do not interfere with each other.

At demultiplexer 250, coupler 266 and polarizer 281 are utilized to retrieve the optical clock signal from optical fiber 232. The optical fiber from polarizer 281 is rotated 90 degrees, 265, before it is connected to laser frame clock 251 to create a V polarized clock signal. The V polarized received data signal is separated from the H polarized clock signal on optical fiber 232 using polarizer 282. The laser frame clock circuit 251 includes a wavelength filter and optical amplifier (e.g., erbium amplifier) to recondition the deteriorated received clock signal into a clean clock signal.

According to another aspect of the invention, the framing clock signal may be sent over optical fiber 232 using a wavelength different from the wavelength of the data signal. In such an embodiment, laser frame clock circuit 251 would also require a wavelength filter and amplifier, which operate at the clock signal frequency, to regenerate a clean clock signal.

Optionally, in case 3, a separate optical fiber 231, part of optical fiber link 230, which connects multiplexer 200 to demultiplexer 250, provides an optical communication path over which a common clock signal can be sent. Thus, in this arrangement laser frame clock 201 is used as the clock source for laser frame clock 251.

With reference to FIG. 4, I describe the operation of an illustrative, all-optical AND gate circuit, implemented using a Sagnac switch 400. Such a Sagnac switch AND gate may be utilized for any or all of the AND gates of multiplexer 200 and/or demultiplexer 250. An illustrative Sagnac switch is described in more detail in the co-pending U.S. patent application Ser. No. 07/521,774 now U.S. Pat. No. 5,144,375 of Gabriel, Houh and Whitaker entitled "Sagnac Optical Logic Gate," filed May 10, 1990, which is incorporated by reference herein. Such Sagnac switch gates have been demonstrated to operate at rates over a factor of twenty greater than electronic gates.

Sagnac switch 400, illustratively, includes an optical transmission medium, i.e., optical fiber 410 (including segments 411) that is connected at both ends to a Polarization Maintaining Coupler (PMC) 413. The phase 1 V polarized optical clock signal, 431, and H polarized optical data signal A, 432, provide inputs to Sagnac switch 400. The optical data signal A, 432, is applied to Sagnac switch 400 via coupler 414. The phase 1 optical clock signal 431 is applied to an input SI which is coupled via coupler 412 to port 1 of coupler 413. Ports 2 and 4 of coupler 413 are connected to the two ends of fiber 410, and port 3 of coupler 413 forms an output SO of the Sagnac loop (and output of AND gate 210). Fiber 410 thus forms a loop, (also referred to herein as fiber loop 410) which in the context of this disclosure, refers to the path over which a signal travels and, more particularly, to arrangements where the path forms a closed, or nearly closed, figure. The output SO of Sagnac switch 400 is the logical AND of the inputs A and clock $\phi 1$. The inverted output $\overline{SO}$ may be obtained from port $\overline{SO}$ of coupler 412.

The Sagnac switch 400 operates as follows. Clock signal 431 is applied, via coupler 412, to port 1 and is split into two parts that exit coupler 413 at ports 2 and 4: a "mark" clock signal (interaction signal) that travels counter-clockwise, and a "ref" clock signal (reference signal) that travels clockwise. The "mark" and "ref" signals travel through the loop in opposite directions, re-enter coupler 413 and recombine therein. Under normal circumstances, the "mark" and "ref" signals experience the same conditions as they travel through the loop. Even though the propagation speed is a function of many parameters that may be uncontrollable and may or may not change with time, the travel time of the "ref" and "mark" signals is short enough that, basically, all of the parameters remain static. Consequently, no changes occur within the loop to differentiate between the effects of the fiber on the signals traveling in the two directions. The result is a combining of signals in coupler 413 that is constructive with respect to port 1 and destructive with respect to port 3. In consequence, light that enters port 1 of coupler 413 is completely reflected back to port 1, and no output is delivered to port 3. The output from port 1 is outputted on lead $\overline{SO}$ via coupler 412. The above paragraphs describe the operation in the absence of a control signal (data signal A, 432) at port CTLI.

In addition to the above-described structure, Sagnac switch 400 includes a polarization combining coupler 414 that injects a control signal (data signal A, 432, in our embodiment) at port CTLI into a segment 411 of the fiber loop 410. Because coupler 414 is within loop 410, the data signal 432 travels along loop 410 only in one direction; and more specifically, coupler 414 is arranged to inject the control signal that travels along loop 410 in the direction of the "mark" signal. A polarization combining coupler 415 may also be included within the loop of fiber 410 to extract the data signal 432 out of the loop once it has served its control function.

Segment 411 of fiber 410 is a variable refractive-index material that is characterized by the property that the propagation speed of a beam passing through the material is a function of the intensity of the beam that passes through the material. Furthermore, not only does the propagation speed change for the beam (e.g., data signal 432) that effects the change in propagation speed, but it also changes the propagation speed of other beams (e.g., "mark" signal) that pass through the material at the same time. The nonlinear interaction between the data signal 432 and the "mark" signal is by means of cross-phase modulation due to the optical Kerr effect. Of course, the entire length of fiber 410 may be made of such a variable refractive-index material, but for the sake of generality, fiber 410 is drawn as having only a limited segment 411 being made up of this material. Also for the sake of generality, it should be pointed out that the loop of fiber 410 in FIG. 4 does not necessarily have to be fiber. It can be a waveguide, or other means for directing the flow of light.

When the data signal 432 is present and is made to travel through segment 411 with the "mark" signal, the change in propagation speed of the "mark" signal that is caused by the data signal 432 alters the phase of the "mark" signal arriving at coupler 413. When the energy in data signal 432 and the interaction interval within segment 411 are properly controlled, the resulting phase relationship between the "mark" and "ref" signals is approximately $\pi$ radians, meaning that the "mark" signal is about 180 degrees out-of-phase to the "ref" signal. This causes the combining of the "mark" signal and the "ref" signal in coupler 413 to be completely destructive with respect to port 1 and completely constructive with respect to port 3. As a result, all of the energy exits at port 3 (non-reflected signal output port) rather than at port 1 (reflected signal output port).

To ensure the proper operation of the Sagnac switch 400 (that is to minimize the distortion of the pulse which outputs at port SO) requires that the data signal 432 completely traverse the "mark" signal during its transit through segment 411 of the fiber loop 410. This is accomplished by requiring that the material of segment 411 have a dual speed characteristic, one that propagates the control signal at a different rate than the "mark" signal. The difference in the propagation speed may be tied to any controllable parameter of the control signal, such as wavelength, intensity or polarization. In the illustrative embodiment, different polarizations are utilized. That is, the polarization of clock signal 431, applied to Sagnac switch 400, is different from the polarization of the data signal 432 applied thereto.

As long as the data signal 432, which acts as a control signal, completely traverses the "mark" signal within segment 411 the Sagnac switch 400 operation is completely insensitive to the shape of the control signal or its precise timing. Rather, it is only sensitive to the overall energy of the control signal (integral of the control pulse).

In the present embodiment, since the control signal is actually the input data signal 432 it has the same clock rate as the clock signal 431. As previously noted, however, the data signal 432 and the clock signal 431 have different polarizations. Segment 411 is selected to have a controllable parameter based on polarization; thus, fiber loop 410 is formed from dispersive fiber. The data signal 432 is selected to be at a polarization which transits segment 411 at a propagation rate which is different from that of the polarization of clock signal 431. The data signal 432 polarization and the clock signal 431 polarization are chosen with the fiber dispersion to give sufficient differential propagation or travel speed such that the data and clock pulses completely traverse one another over the length of segment 411. For example, we assume that data signal 432 is selected to be at the "fast" polarization; hence, clock signal 431 must enter the loop 410 first. Thus, data signal 432 can traverse or "slip" past the "mark" signal within the length of segment 411, even though the "mark" signal precedes the entrance of the data signal 432 into segment 411.

It should be noted that an equivalent effect is realized if the "mark" signal is made to traverse the data signal 432. This can happen if the "mark" signal polarization is the fast polarization and data signal 432 is the slow polarization of segment 411.

It may be noted in passing that the "ref" signal also passes through segment 411 and that its speed is also somewhat affected by data signal 432. But, since data signal 432 and the "ref" signal travel in opposite directions, their interaction time is much shorter than the interaction time of the "mark" and data signal 432.

In summary, only when both data signal 432 and clock signal 431 are present will a clock pulse signal exit port SO. If either the data signal 432 or the clock signal 431 alone is present, no clock pulse signal exits port SO. Thus, output port SO of Sagnac switch 400 provides the logical AND of data input 432 and clock signal 431.

While the present invention has, illustratively, been described using one type of polarization for the clock signal and another for the data signal, it should be obvious that they could be reversed without changing the operation of the present invention.

It should also be noted that multiplexer 200 and demultiplexer 250 may be arranged to obtain multiple samples from any or all of the data inputs A–D. Such an arrangement may be implemented, illustratively, by using a multiple unit optical OR circuit (such as 220–223) connected to the clock input of an optical AND circuit (e.g., 210) with each OR circuit input connected to a unique phase of the frame clock 201. Obviously, the intervals between clock pulses from frame clock 201 would have to be increased to accommodate the increased number of clock phases needed.

Thus, what has been described is merely illustrative of the application of the principles of the present invention. Other arrangements and methods can be implemented by those skilled in the art without departing from the spirit and scope of the present invention.

I claim:

1. Optical multiplexer apparatus for multiplexing a plurality of electrical digital input signals, comprising
   means for receiving and converting said electrical digital input signals into corresponding optical digital input signals and
   all optical circuit means for generating optical digital signals samples by cyclically sampling said optical digital input signals at a sample rate which at least equals the Nyquist rate for each corresponding electrical input signal and for generating and outputting a multiplexed optical digital output signal formed from the optical digital signal samples.

2. The apparatus of claim 1 wherein said sampling means includes
   a plurality of optical AND gate means, each having one input connected to a different optical digital input signal and each having a second input connected to a different clock signal and
   optical combining means for combining an optical digital output signal from each of said optical AND gates into said multiplexed optical digital output signal.

3. The apparatus of claim 2 wherein said optical AND gate is implemented using a Sagnac switch.

4. The apparatus of claim 3 wherein each of said optical digital input signals has a first polarization when inputted to its associated AND gate means and each different clock signal utilizes the same second polarization, orthogonal to said first polarization.

5. The apparatus of claim 3 wherein each of said optical digital input signals has a first wavelength when inputted to its associated AND gate means and each different clock signal utilizes a second wavelength.

6. The apparatus of claim 2 wherein said optical combining means includes a plurality of optical isolators, each isolator having an input connected to an output of a different optical AND gate means and having an output connected to other outputs of other couplers to generate said multiplexed optical digital output signal.

7. The apparatus of claim 2 wherein each of said different clock signals is derived from a common clock signal using different predetermined delays.

8. The apparatus of claim 7 wherein said multiplexed optical digital output signal is sent over an optical facility using a first wavelength and said common clock signal is sent over said optical facility using a different wavelength.

9. The apparatus of claim 7 wherein said multiplexed optical digital output signal is sent over an optical facility using a first polarization and said common clock signal is sent over said optical facility using a different polarization.

10. The apparatus of claim 2 wherein the clock signal has a frame rate which ensures that the corresponding optical digital input signal of any electrical input signal will be sampled at least as the Nyquist rate.

11. An optical time division multiplex system for multiplexing a plurality of electrical input digital signals into a time-division-multiplexed optical digital signal for transmission from a first location over an optical facility to a second location and for demultiplexing said multiplexed optical digital signal received at a second location to recover said plurality of electrical digital signals, said system comprising
   multiplexer apparatus including means for receiving and converting said plurality of electrical digital input signals into a corresponding plurality of optical digital input signals and all optical circuit means for generating an optical digital signal sample by cyclically sampling each optical digital input signal at a sample rate which at least equals the Nyquist sample rate for each corresponding electrical digital input signal and for generating and outputting said multiplexed optical digital signal formed from the Nyquist rate optical digital signal samples and demultiplexer apparatus including second all optical circuit means for cyclically sampling said multiplexed optical signal to produce a demultiplexed plurality of optical digital signals and a plurality of optical detector means, each detector means converting one of said demultiplexed plurality of optical digital signals into a corresponding one of a plurality of electrical digital output signals, wherein each electrical pulse of each one of said plurality of electrical digital output signals is produced from the Nyquist rate optical digital signal samples, representing said each electrical pulse, in said corresponding one of said demultiplexed plurality of optical digital signals.

12. The system of claim 11 wherein said sampling means includes a plurality of optical AND gate means, each having one input connected to a different optical digital input signal and a second input connected to a different clock signal and optical combining means for combining an optical digital output signal from each of said optical AND gates into said multiplexed optical digital output signal.

13. The system of claim 12 wherein said optical AND gate is implemented using a Sagnac switch.

14. The system of claim 12 wherein said optical combining means includes a plurality of optical isolators, each isolator having an input connected to an output of a different optical AND gate means and having an output connected to other outputs of other couplers to generate said multiplexed optical output signal.

15. The system of claim 11 wherein each of said different clock signals is derived from a common clock signal using different predetermined delays.

16. The system of claim 15 wherein said multiplexed output signal is sent over said optical facility using a first polarization and said common clock signal is sent over said optical facility using a different polarization.

17. The system of claim 15 wherein said multiplexed output signal is sent over said optical facility using a first wavelength and said common clock signal is sent over said optical facility using a different wavelength.

18. Optical demultiplexing apparatus comprising means for receiving an N channel multiplexed optical digital data signal stream, each of the N channels being an optical digital signal sample derived by sampling an optical digital signal representation of a corresponding electrical signal at at least the Nyquist rate, all optical circuit means for cyclically sampling and demultiplexing said received N channel multiplexed optical digital data signal stream to obtain N separate optical digital data signal streams and a plurality of optical detector means, each detector means converting one of said N optical digital data signal streams into a corresponding one of a plurality of electrical digital output signals, wherein each electrical pulse thereof is produced from the Nyquist rate samples, representing said electrical pulse, of said corresponding one of said N optical digital data signal streams.

19. The apparatus of claim 18 wherein said sampling means includes a plurality of optical AND gate means, each having one input connected to a different one of said N optical digital data signal streams and each having a second input connected to a different clock signal.

20. The apparatus of claim 19 wherein said optical AND gate is implemented using a Sagnac switch.

21. The apparatus of claim 20 wherein each of said N optical digital data signal streams has a first polarization when inputted to its associated AND gate means and each different clock signal utilizes the same second polarization, orthogonal to said first polarization.

22. The apparatus of claim 20 wherein each of said N optical digital data signal streams has a first wavelength when inputted to its associated AND gate means and each different clock signal utilizes a second wavelength.

23. The apparatus of claim 19 wherein each of said different clock signals is derived from a common clock signal using different predetermined delays.

24. Optical multiplexing apparatus comprising means for receiving a plurality of optical input signals, each received over a communication channel connected to said apparatus and optical circuit means for cyclically sampling said optical input signals at a sample rate which at least equals the Nyquist rate for each optical input signal and for generating and outputting a multiplexed optical output signal formed from the optical input signal samples, said optical sampling means including a plurality of optical AND gate means, each having one input connected to a different optical input signal and a second input connected to a different clock signal, said optical AND gate means generating the optical input signal samples and optical combining means for combining said optical input signal samples from each of said optical AND gates into said multiplexed optical output signal.

* * * * *